United States Patent [19]

Machen

[11] Patent Number: 5,113,612
[45] Date of Patent: * May 19, 1992

[54] METHOD OF PROVIDING A SET OF INSTRUCTIONS

[75] Inventor: James A. Machen, Plymouth, Minn.

[73] Assignee: Jamco International, Inc., Eden Prairie, Minn.

[*] Notice: The portion of the term of this patent subsequent to Aug. 15, 2006 has been disclaimed.

[21] Appl. No.: 576,227

[22] Filed: Aug. 31, 1990

Related U.S. Application Data

[63] Continuation of Ser. No. 393,529, Aug. 11, 1989, which is a continuation-in-part of Ser. No. 51,522, Oct. 20, 1987, Pat. No. 4,856,214.

[51] Int. Cl.⁵ .................................................. G09F 3/00
[52] U.S. Cl. .......................................... 40/336; 40/316; 40/661
[58] Field of Search ................. 40/316, 336, 339, 632, 40/661; 281/49, 48; 150/149

[56] References Cited

U.S. PATENT DOCUMENTS

| | | | |
|---|---|---|---|
| 520,856 | 6/1894 | Milliron | 281/49 |
| 1,128,136 | 2/1915 | Hano | |
| 1,303,100 | 5/1919 | Middlebrook | 40/336 |
| 1,604,601 | 10/1926 | Platt | |
| 1,608,573 | 11/1926 | Willson | |
| 1,650,430 | 11/1927 | Clark | 40/339 |
| 1,717,801 | 6/1929 | Metcalf | |
| 1,994,961 | 3/1935 | Proskauer | 40/632 X |
| 1,999,583 | 4/1935 | Bouvier | |
| 2,411,368 | 11/1946 | Dow | |
| 2,503,114 | 4/1950 | Kennard | |
| 2,788,041 | 4/1957 | Carver | |
| 3,141,213 | 7/1964 | Rinaldi | 150/149 X |
| 3,187,795 | 6/1965 | Stephenson | |
| 3,974,576 | 8/1976 | Quinn, III | |
| 3,999,317 | 12/1976 | Owens | |
| 4,237,947 | 12/1980 | Mater | |
| 4,656,767 | 4/1987 | Tarrant | 40/316 |
| 4,856,214 | 8/1989 | Machen | 40/661 X |

FOREIGN PATENT DOCUMENTS

| | | | |
|---|---|---|---|
| 47904 | 5/1930 | Norway | 40/316 |
| 128752 | 1/1929 | Switzerland | 281/48 |
| 162905 | 5/1921 | United Kingdom | 150/149 |

OTHER PUBLICATIONS

The Jamco International, Inc. brochure, copyright 1987 by Jamco International, Inc.

Primary Examiner—Kenneth J. Dorner
Assistant Examiner—J. Hakomaki
Attorney, Agent, or Firm—Merchant, Gould, Smith, Edell, Welter & Schmidt

[57] ABSTRACT

A method of providing a user of a telephone with a set of instructions respecting the use and function of the telephone. The method including the steps of providing a telephone, providing an attachable information providing device which includes means for attaching said device to an extensible, coiled telephone cord interconnecting elements of the telephone, and attaching the attachable information providing device to the telephone cord so that the set of instructions respecting the use and function of the telephone is readily available to the user thereof and so that said means for attaching substantially encircle a portion of the cord.

9 Claims, 4 Drawing Sheets

FIG. 4

ADDITIONAL FEATURES

Call Waiting *
Hang up , your phone
will ring, answer
*To Hold Call and
Answer Second Call*
Press
    Receiver Button
Touch *9
*To Return,* Repeat
**Call Waiting
Deactivation**
Touch *70
*(If Available To Your
System)

Call Forwarding
Activate Touch *72.
    Dial Number
Cancel Touch *73.
    Hear Dail Tone,
    Hang Up
Call Pickup
Touch *8
**See Inside for
Instructions on:**
Alternate Answer
Convenience
Dailing
Intercom

BASIC FEATURES

Call Transfer
Press
    Receiver Button
    Hear Dial Tone
    Dial Number
    Within Your System
    When Number Rings
    Hang Up
Conference
Press
    Receiver Button
    Hear Dial Tone
    Dial Number
    Announce
Press
    Receiver Button

Call Hold
Press
    Receiver Button
    Hear Dial Tone
Touch *9
*To Return*
Press
    Receiver Button
    Hear Dial Tone
Touch *9

METHOD OF PROVIDING A SET OF INSTRUCTIONS

CROSS-REFERENCE TO RELATED APPLICATION

This application is a continuation application of co-pending U.S. patent application No. 07/393,428, filed Aug. 11, 1989, which is a continuation-in-part application of U.S. patent application Ser. No. 051,522 filed Oct. 20, 1987, now issued as U.S. Pat. No. 4,856,214.

FIELD OF THE INVENTION

The present invention relates to informational devices or booklets which are used in association with apparatus provided for carrying out specific functions, preferably telephone apparatus, or the like.

BACKGROUND OF THE INVENTION

It is well known that certain information, not readily known by occasional users of apparatus provided for carrying out specific functions, is often needed by such users at the site of use. For instance, when an individual who is unfamiliar with a telephone or its particular functions, wants to use the telephone, it would be convenient for such an individual to have an informational pamphlet or the like close at hand to provide the individual with information he or she may need at the time of use in order that, the information desired regarding the functions thereof may be easily accessed. Unfortunately, such information is often unavailable when needed by the user. Even if it has been provided in a companion pamphlet or the like which is intended to be provided in a location in proximity to the apparatus, the pamphlet may be lost, removed or misplaced. Although the desired information may be readily available in such an informational pamphlet, it is of no use if the pamphlet has been lost, removed or otherwise separated from the apparatus and nowhere to be found when the information is needed by the user thereof.

Accordingly, a need exists for an informational device or booklet which is capable of providing needed information to users of apparatus provided for carrying out specific functions. Although it is known that needed informational devices have been provided in the past, these devices are often lost or removed from the intended place of use which is a location in near proximity to the specific apparatus. The present invention provides a solution to this and other problems, and also offers other advantages over the prior art, and solves other problems associated therewith.

SUMMARY OF THE INVENTION

In view of the difficulty of providing information to users of apparatus provided for carrying out specific functions, such as telephones, it is an object of the present invention to provide a method of providing a user of a telephone with a set of instructions respecting the use and function of the telephone. Preferably, the telephone is provided with a handset and a telephone base interconnected by an extensible, coiled telephone cored. The method includes the step of providing an attachable information providing device having a set of instructions respecting the use and function of the telephone and having structure for attaching the information providing device to the telephone cord. Preferably, the information providing device includes a housing having at least one pocket and a card which fits into the pocket, the set of instructions being located on the card. The method further includes the step of attaching the information providing device to the telephone cord such that the set of instructions respecting the use and function of the telephone is readily available to the user thereof. Preferably, the step of attaching includes substantially encircling a portion of the telephone cord to thereby secure the information providing device thereto. It is a further object of the present invention to provide an attachable informational booklet or information providing device which is attachable to an elongated member attached to such an apparatus, such as telephone cord or the like. The attachable informational booklet of the present invention comprises a plurality of information providing segments. Each segment is a substantially planar member having front and rear faces and including means for providing transcribed information to a user thereof. Each of the segments is connected to at least another of the segments such that the booklet can be folded so that at least two of the faces can oppose one another. The booklet further includes coupling means for coupling two opposing faces together, wherein said coupling means can couple the booklet together around the elongated member thereby attaching said booklet thereto. Preferably each segment includes a portion of flexible plastic material. In preferred embodiments, each segment is made of a flexible clear plastic material and includes a pocket for receiving an information card. The information on the information card is preferably readable to a user of the booklet through the clear plastic material used to make each of the respective segments. A preferred embodiment of the present invention includes two segments which are foldably connected by hinge means and can be coupled around the elongated member and thereby attached thereto. An alternate embodiment of the present invention includes three segments; an inner portion and an outer portion interconnected by a central portion. Preferred coupling means include first and second fastener portions which preferably adhere to opposing faces of the respective segments when the opposing fastener portions are connected. Such fastener portions preferably adhere to a bottom or rear face of the inner portion and a front or top face of the outer portion of the alternate embodiment described hereinabove. The alternate embodiment is coupled together around an elongated member, such as a telephone cord, by folding the inner portion inward toward the central portion and then folding the outer portion inward toward the central portion and on top of the inner portion, such that the front face of the outer portion opposes the rear face of the inner portion. The opposing fastener portions can then be coupled together, thereby connecting the alternate informational booklet around the elongated cord. It will be appreciated that the respective segments of the informational booklets of the present invention may be coupled together with said coupling means prior to attachment to the elongated member, and that the booklet may then be slightly deformed in order to allow the elongated member to be inserted therethrough subsequent to the coupling of the booklet.

In preferred embodiments of the present invention at least one, or preferably each, of the segments include a pocket for insertion of an informational card or cards which may be read by a user of the booklet. Alternate embodiments may include additional segments including additional substantially flat page-like members for providing additional information to a user thereof. In some embodiments, the user may be required to uncouple the informational booklet of the present invention in order to access the information included therein. In certain embodiments, segments may provide information without providing pockets to hold information cards. In these embodiments, information may be incorporated directly into the segment during manufacture.

The informational booklet of the present invention will be a great convenience to users of apparatus provided for carrying out specific functions. Modern day telephones are an excellent example. Because many of these modern telephones are programmable and have many features which may require explanatory information in order for an uninformed user to access these features, it is very important to have the ability to provide information to the user in a manner which assures the presence of the information in the immediate location of the particular apparatus being used at the time it is needed by the uninformed user. The present invention can be used to provide the needed information in a reliable way because it can be attached directly to the telephone cord so that it is not easily separated from the telephone itself. It will also be appreciated that the present invention will provide advertisers with significant opportunities to promote their products and/or services. Since each of us uses the telephone frequently, the attachable information booklet of the present invention will provide advertisers with a great opportunity to reinforce advertising messages including the development of name recognition for products or services provided by various companies, institutions or the like. In return for receiving this advertising opportunity, the advertiser will provide the owner of the telephone with access to information which the owner or user thereof would like to be readily available at the location of the telephone or other apparatus when a user, either the owner, or an associate, employee, or guest of the owner, uses the apparatus.

As used herein, "plastic" means any synthetic or manmade polymeric material. In addition, "clear plastic" means any synthetic or man-made polymeric material through which a sighted person can see well enough to allow the person to read printed material on a surface of an information card beneath the plastic. Furthermore, "transcribed information", as used herein, means information which is placed in a transcribed format from which individuals can decipher the information for their own knowledge. Examples of such transcribed information include, but are not limited to, information printed in readable text of any language, graphic information, and information which is printed in Braille which is readable by touch by those who have been trained therein. The action of providing transcribed information to a user means taking the transcribed information available so that they can decipher the information provided thereby.

These and various other advantages and features of novelty which characterize the present invention are pointed out with particularity in the claims annexed hereto and forming a part hereof. However, for a better understanding of the invention, its advantages, and the objects obtained by its use, reference should be made to the drawings which form a further part hereof and to the accompanying descriptive material, in which there is illustrated and described preferred embodiments of the present invention.

BRIEF DESCRIPTION OF THE DRAWINGS

In the drawings, in which like and primed reference numerals indicate corresponding parts of preferred embodiments of the present invention throughout the several views.

FIG. 4 is a plan view of a pair of alternate information cards similar to those shown in FIG. 2;

DETAILED DESCRIPTION OF THE PREFERRED EMBODIMENTS

Figure 1:
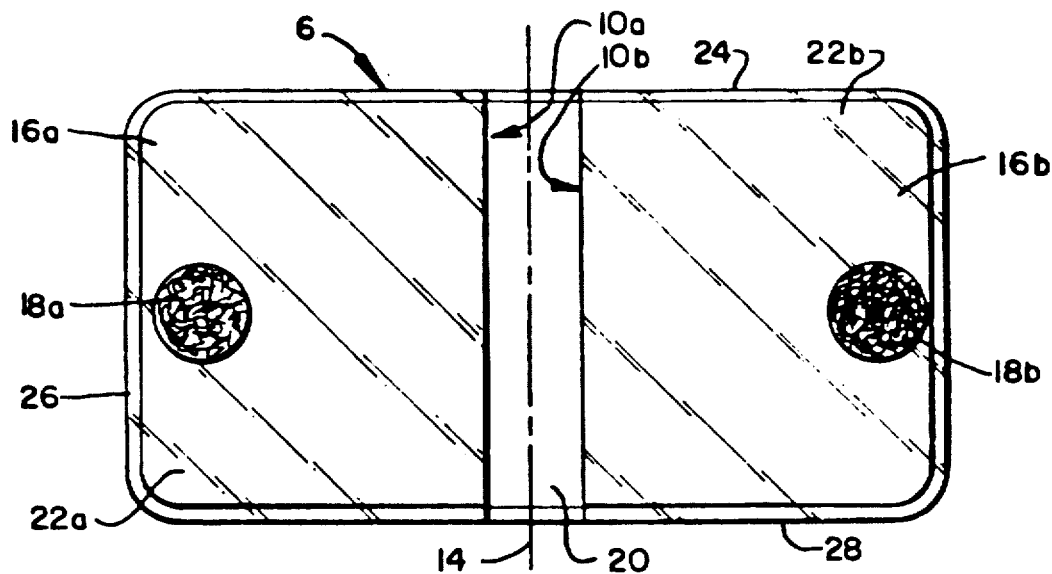
FIG. 1 is a plan view of a preferred bifold holder in accordance with the present invention.
Figure 2:
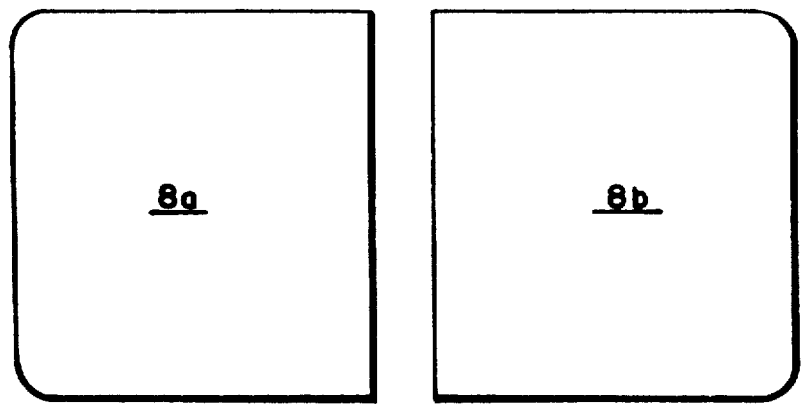
FIG. 2 is a plan view of a pair of information cards in accordance with the present invention which can be inserted into the respective pockets of the plastic holder shown in FIG. 1.
Figure 3:
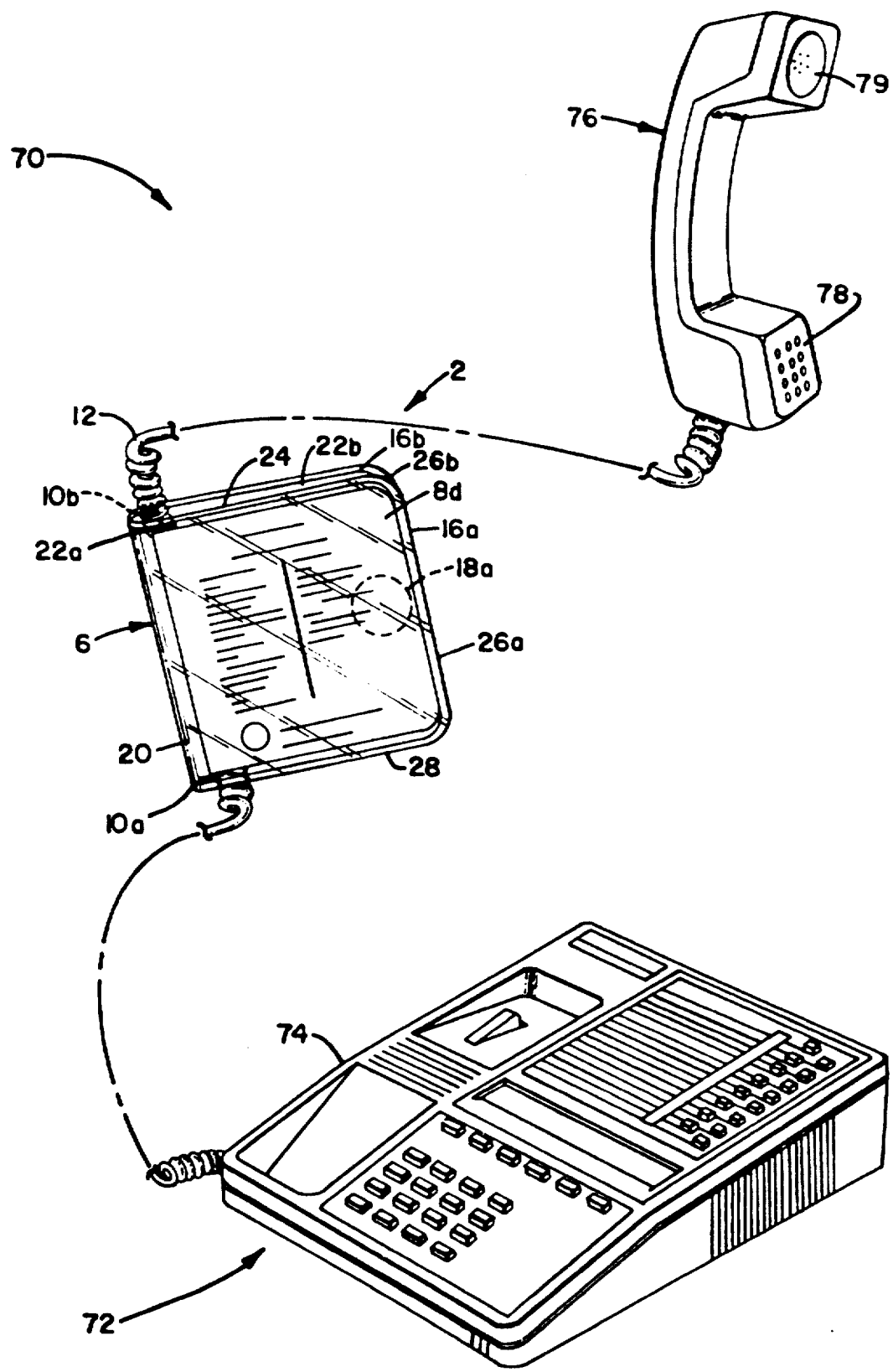
FIG. 3 is a perspective view of a preferred attachable information booklet in accordance with the present invention, including the bifold holder shown in FIG. 1, when attached to a telephone cord.

Referring now to the drawings, and to FIGS. 1-3 in particular, a preferred informational booklet or information providing device 2 of the present invention preferably includes a holder 6 which preferably displays printed information (not shown) on information cards 8 inserted therein.

The holder 6 is preferably made of clear plastic and includes clear plastic pockets 10a and 10b to hold printed information cards 8. The cards 8 can be inserted into the pockets 10 of the holder 6, and the holder 6 can be folded around an elongated cord 12 such as the telephone cord 12 shown in FIG. 3. A telephone apparatus 70 is also provided. The apparatus 70 preferably includes a telephone 72 and the attachable informational booklet 2 shown in FIG. 3. The telephone 72 includes a base 74, a cord 12, and a handset 76 including a mouthpiece or microphone 78 and an earpiece 79. The handset 76 is connected to the base 74 by the telephone cord 12, which is preferably a coiled telephone cord 12 as is conventional in the art. When the holder 6 is folded generally along a center line 14, generally shown as being equidistant from the respective pockets 10 shown in FIG. 1, and the outer edges of each of the respective ends 16a and 16b of the holder 6 are roughly aligned as shown in FIG. 3, the holder 6 can be coupled together with opposing fastener portions, preferably opposing Velcro TM buttons or tabs 18a and 18b. It will be appreciated that mechanisms used for coupling including, but are not limited to, snaps, buttons, pressure sensitive adhesive tabs, other fastener tabs or patches, and the like. It will also be appreciated that alternate embodiments of the attachable informational booklet of the present invention can also be attached to the telephone cord in this or other manners.

Referring now also to FIG. 4, which shows the printed information which appears on a pair of alternate information cards 8c and 8d, it will be appreciated that the information which can be provided to the user of a telephone, is the type of information which one only needs when one is using that particular device, and that it is important for that information to be readily available at a location near that particular device at the time when the information is needed.

Figure 5:
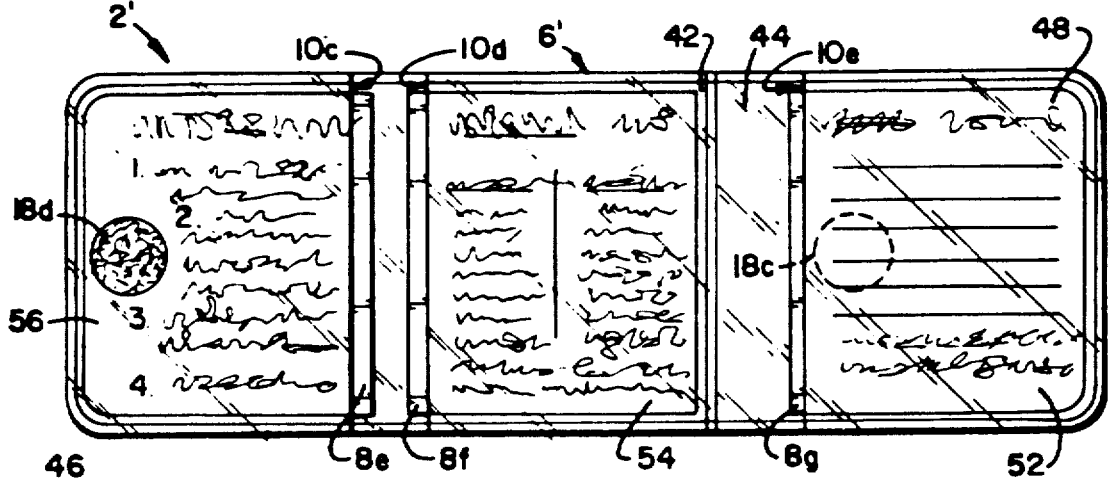
FIG. 5 is a plan view of an alternate attachable informational booklet in accordance with the present invention.
Figure 6:
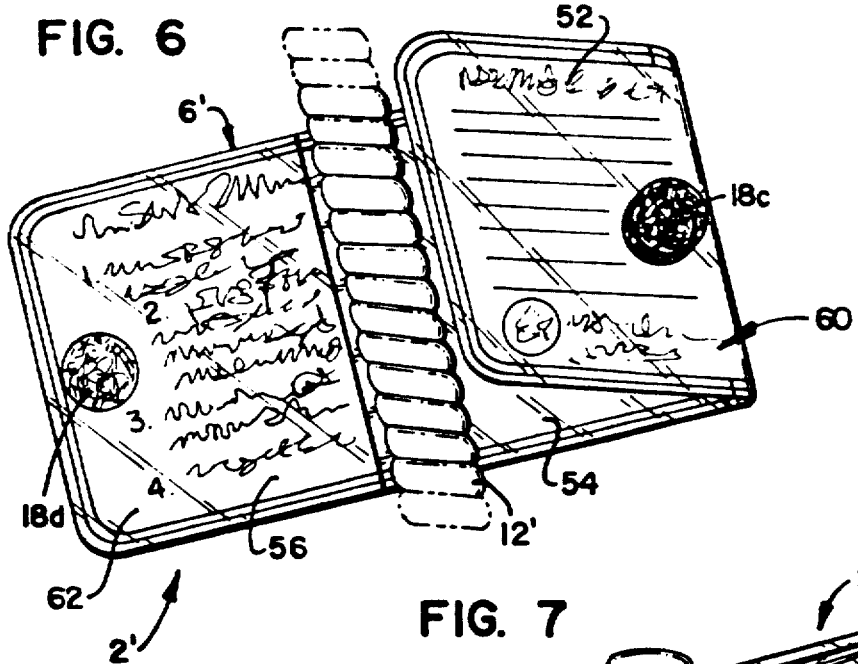
FIG. 6 is a perspective view of the alternate attachable booklet shown in FIG. 5 following a first step in a process of attaching the booklet to a telephone cord.
Figure 7:
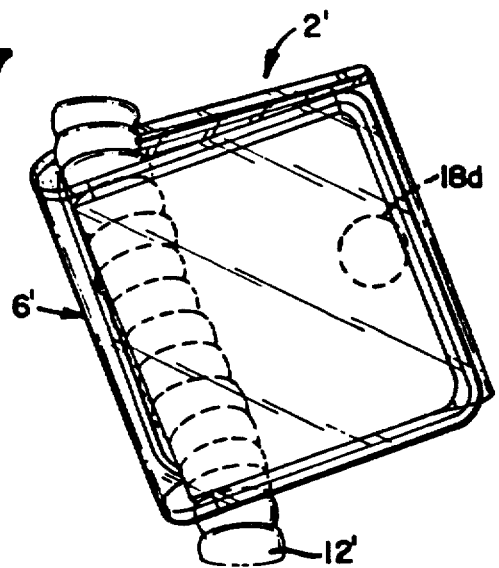
FIG. 7 is a perspective view of the alternate attachable booklet shown in FIG. 5 after it has been attached to the telephone cord subsequent to the stage in that process shown in FIG. 6.

Referring now also to FIGS. 5-7, an alternate embodiment of the informational booklet 2' may also be secured to a telephone cord 12'. The informational booklet 2' shown in FIG. 5 includes a holder 6' and three printed information cards 8e, 8f and 8g. The holder 6' is a trifold device which is preferably made of the same material used to make the holder 6 shown in FIGS. 1-3. The respective information cards 8e, 8f, 8g are inserted into pockets 10c, 10d and 10e, respectively. The center pocket 10d is preferably formed by heat sealing a generally rectangular piece of plastic 42 to a larger bottom piece of plastic 44. The plastic material used to make the holder 6' is preferably a clear plastic material, preferably polished on two sides and also of a heavy gauge, such as 10 gauge material. The rectangular piece of plastic 42 is preferably sealed to the bottom piece 44 on three sides so that there is only one opening for insertion of the information card 8f. Additional pieces of plastic material 46 and 48 are preferably heat sealed to the bottom piece 44 in a similar manner to form the remaining pockets 10c and 10e, respectively.

The trifold booklet 2' can be secured about a telephone cord 12' by folding an inner segment or portion 52 toward the cord 12' which is placed between the center segment or portion 54 and the outer segment or portion 56. A tab or button 18c is placed on the bottom or rear face 60 of the inner segment 52 in a position relatively close to the center segment 54. When the outer segment 56 is folded over the cord 12' which is positioned between the outer segment 56 and the center segment 54, another tab or button 18d on the front face 62 of the outer end 56 is positioned such that it will be in proper alignment to be coupled with the tab or button 18c on the inner segment 52. In this way, the booklet 2' can be joined together around the telephone cord 12' and secured thereto, as shown in FIG. 7.

It will be appreciated that the informational booklet of the present invention can include a bifold holder 6 as shown in FIGS. 1-3, a trifold holder 6' as shown in FIGS. 5-7; or it can include alternate holders (not shown) which have multiple folds in addition to the two or three which are shown in the preferred embodiment and the alternate embodiment shown in FIGS. 1-7, and may also include additional pages of informational material which are affixed thereto in any other manner. For instance, an additional segment could be connected to the inner end 52 of the trifold holder 6' shown in FIGS. 5-7. This additional segment could be folded inside of the holders prior to folding the inner segment 52 toward the telephone cord positioned between the center segment 54 and the outer segment 56. It will be appreciated that many other attachments could be created for the purpose of adding additional information display capacity.

The mechanisms used for coupling the respective portions of the informational booklet of the present invention around an elongated member exemplified by the telephone cords 12 and 12' shown in FIGS. 3 and 7 include all known coupling mechanisms which are appropriately sized for the intended use. Coupling mechanisms used in the present invention can include, but are not limited to, buttons, snaps, tabs, fasteners and the like which are made of metal, polymeric materials, natural materials and the like. Some examples include Velcro TM tabs, Dual Lock TM fasteners and fastening systems (3M Company, St. Paul, Minn.), Scotchmate TM Hook and Loop fasteners and fastening systems (3 M Company, St. Paul, Minn.), metal snap fasteners (Model No. 2131) from Fruit of the Loom, Inc., Bowling Green, Ky., Clinton ® snap fasteners from Dritz Corp., Spartanburg, S.C. and the like. Other snap fasteners or buttons which are envisioned include polymeric snap fasteners which can be heat sealed directly to the polymeric materials which are preferably used to construct the outer portion of the informational booklet of the present invention.

It will be appreciated that the informational booklet in accordance with the present invention may be made of many conventional materials, including fabric, leather and other natural materials. However, polymeric materials, preferably clear plastic of one type or another, is preferably. One desirable feature of the preferred embodiments of the present invention is that they display the information which is to be displayed in a convenient manner. For this reason, the materials used to make the invention are not limited to any particular type of material so long as the holder displays the information so that it can be easily accessed by the user and the booklet can be secured to an elongated member attached to the apparatus provided for carrying out specific functions for which the information is to be provided. It will also be appreciated that the informational booklet of the present invention, the holder thereof and the informational cards therefor may be of any size practical for use and attachment to the elongated member attached to such an apparatus. It will be further appreciated that the elongated member attached to the apparatus provided for carrying out specific functions may simply be a string, a cord such as a telephone cord or an outlet or connecting cord of any type, or a pipe or conduit such as that connected to a hot water heater, furnace, gas meter or the like. Additional examples include electrical cords, phone cords and the like connected to computer keyboards, display screens, and other elements of a computer, copy machines, fax machines and other transmission devices, and control devices connected or interconnected therewith.

The attachable informational booklet of the present invention could be used in many ways. Preferably, it is attachable to a telephone cord to provide information about the use of the telephone and about carrying out specific functions which may be programmed into the telephone. For instance, there are now customer calling services, speed dialing, transfer functions, redialing functions, intercom functions and other functions including programming functions which can be accessed if the user is informed about their availability. Some of the entities which may have a need for attachable informational booklets include airline companies, hotel and motel chains, schools, hospitals, business offices, governmental offices, real estate companies and the like where listings of specific telephone numbers may be conveniently displayed for handy reference in an attachable booklet which will not be easily separated from the telephone and misplaced. Hotel an motel chains will have an interest in this device in order to inform residents of the services in the hotel or motel which can be easily accessed by the use of the telephone to which the attachable informational booklet is attached. Such a device may also be used to alert telephone users of emergency numbers, including directions for accessing emergency 911 systems. Advertisers may have an interest in the use of attachable informational booklets to promote name recognition, products and/or services. Promotional efforts may include the mailing of attachable informational booklets to corporations or private residences as a convenience device providing the user with a convenient way to keep key numbers close to the telephone where they are often used which can also be used to promote a product and/or a service. For instance, emergency hospitals, childcare chains, charitable organizations, political office holders, handyman services, real estate companies, local restaurants and the like can promote their products and/or services by conducting a mass mailing in their market area. Other institutions which may be interested would include co-ops, banking institutions, repair services, babysitting services and the like.

In the telecommunications industry, the attachable informational booklet can be used to promote a particular telecommunications company by developing name recognition and also retaining customers for custom calling services, speed dialing, speed call 8, speed call 30, intercom, interconference calling services, and the like. Instructions for those particular services can be provided in the informational booklet so that they are more readily used both in private residences and in public places. In hotel chains, information that needs to be provided would include information regarding the use of telephones as well as information regarding other services provided by the hotels themselves. A nearby food delivery service may also wish to include an advertisement or even an entire menu in an attachable informational booklet attached to a room phone. A banking institution may wish to promote name recognition and also provide information about its banking hours, services offered and the various numbers its customers may call to receive the information they may need from time to time. It will be appreciated that the uses of the informational booklet are numerous and that it will provide many advantages over the prior art.

In addition to these uses, it is envisioned that polymeric material used for an informational booklet of the present invention can include segments which are formed to provide information to individuals who are vision impaired. This information would be provided in Braille so that those individuals could access information which would preferably be available to sighted individuals in the manners previously described at the same time. Also, embodiments made solely for the vision impaired could be made entirely out of moldable materials so that a plurality of surfaces are available for providing information in Braille. Such devices would not require pockets, however, it is believed that it would be preferable to provide the Braille in addition to the printed information in the respective pockets because of the limited need for a booklet of this type solely for the vision impaired.

When the informational booklet of the present invention is being made for a use in an environment which is expected to expose the booklet to high temperatures, it may be desirable to use polymeric snaps or buttons which can be heat sealed directly to the materials used to make the holder. The interconnection between the snaps and the rest of the material used to make the holder would be designed to withstand the temperatures expected. In other embodiments, other heat resistant coupling mechanisms could be used, such as metal snaps, buttons and the like which are not susceptible to delamination at temperatures between 90°-150° F.

The preferred attachable informational booklet 2 of the present invention, as shown in FIG. 3, is attachable to a telephone cord 12. The holder 6 provides sufficient physical flexibility to grasp the telephone cord 12 at virtually any location. The holder 6 is held together around the cord 12 by reciprocating male and female coupling devices, preferably Velcro ™ buttons 18a and 18b, that are strategically placed so that the information cards 8 within the holder 6 will not fall out of the booklet 2 and the booklet 2 will not slip down on the cord 12. The preferred informational booklet 2 can provide up to four sides of printed information contained within the 2 plastic pockets 10a and 10b. Each pocket can hold one or more cards 8 and display printed information from surfaces of either one or two cards 8. It will be appreciated that the attachable informational booklet offers the owner significant flexibility with respect to changing, altering, and updating information printed on the interchangeable information cards 8. Both the constant availability of the information in a location in near proximity to the functioning equipment for which the information is provided, and the flexibility to change and update this information as the need to provide new or altered information arises, are significant advantages presented by the present invention.

The plastic holder 6 is preferably made with an electronic heat sealing die. This allows the two different plastics to be adhered together. The invention is not limited to any particular size or dimension, but the preferred embodiment has been made having the following dimensions which are presented as an example. The plastic holder 6 is preferably 4 9/16" wide and 2⅝" deep when lying flat. There are two pockets 10a and 10b that open to the inside of the holder 6 which are preferably 1⅞" wide and 2¼" deep. The bottom piece of plastic 20 is preferably made of 10 gauge clear plastic which is polished on two sides. The two pockets 10a and 10b are preferably made by sealing two smaller pieces 22a and 22b of 10 gauge polished (2 side) clear plastic to the bottom piece 20 which forms the outside of the plastic holder 6.

The cards 8 to be inserted are preferably printed on 80 lb. index stock and are available in as many colors as desired. The preferred cards 8 are 1 15/16" wide × 2⅛" deep.

The preferred Velcro ™ buttons or tabs 18b and 18a are ⅜" in diameter and are placed ⅜" from a top 24 of the clear plastic on the pockets 10a and 10b and 1/32" from the edge. In preferred embodiments, the Velcro ™ buttons 18a and 18b and the printed cards 8 will be color coordinated in the various colors desired.

The preferred attachable informational booklet 2 is folded in a book fashion over a telephone cord 12 so that the cord 12 runs horizontally down the spine of the inside fold. The Velcro ™ buttons 18a and 18b are preferably attached to the inside of the holder 6, and centered from the top 24 and bottom 28. The snug fit of the booklet 2 when folded over and coupled together with the Velcro ™ buttons 18a and 18b causes enough friction to hold the attachable informational booklet 2 in place around the cord 12 such that it resists slipping.

The preferred plastic informational booklet 2 has two pockets 10a and 10b in two opposing segments which open to the inside. These pockets 10a and 10b are preferably filled with informational cards 8a and 8b which preferably have information printed on both sides. The information card 8 is designed for flexibility and can accommodate any message, advertising or instructional information. The cards 8 are not limited in usage or color.

It is to be understood, however, that even though numerous characteristics and advantages of the present invention have been set forth in the foregoing description, together with details of the structure and function of the invention, the disclosure is illustrative only, and changes in matters of order, shape, size, and arrangement of parts may be made within the principles of the invention and to the full extent indicated by the broad general of the terms in which the appended claims are expressed.

What is claimed is:

1. A method of providing a user of a telephone with a set of instructions respecting the use and function of the telephone, the telephone having a handset and a telephone base interconnected by an extensible, coiled telephone cord, said method comprising the steps of:
   (a) providing an attachable information providing device, said information providing device including a housing having at least one pocket, a card which fits within said pocket and means for attaching said attachable information providing device to the extensible, coiled telephone cord, said card including a set of instructions respective the use and function of the telephone, wherein said set of instructions are readable when the card is located in said pocket; and
   (b) attaching said attachable information providing device to the telephone cord so that the set of instructions respecting the use and function of the telephone is readily readable by the user thereof.

2. The method of claim 1, wherein said means for attaching include means for substantially encircling a portion of the extensible, coiled telephone cord, said step of attaching including substantially encircling a portion of the extensible, coiled telephone cord.

3. The method of claim 2, wherein said means for substantially encircling includes means for completely encircling a portion of the extensible, coiled telephone cord, said step of substantially encircling including completely encircling a portion of the extensible, coiled telephone cord.

4. A method of providing a user of a telephone with a set of instructions respecting the user and function of the telephone, the telephone having a handset and a telephone base interconnected by an extensible, coiled telephone cord, said method comprising the steps of:
   (a) providing an attachable information providing device, said information providing device including visible surface means for displaying information and a set of printed instructions respecting the user and function of the telephone which are readable from said visible surface means, said information providing device further including attachment means for substantially encircling a portion of the extensible, coiled telephone cord; and
   (b) attaching said attachable information providing device to the telephone cord so that said set of instructions respecting the user and function of the telephone are readily available to the user thereof, said step of attaching including substantially encircling a portion of the extensible, coiled telephone cord with said attachment means to thereby secure the attachable information providing device thereto.

5. The method of claim 4, wherein said attachment means for substantially encircling includes means for completely encircling a portion of the extensible, coiled telephone cord, said step of substantially encircling including completely encircling a portion of the extensible, coiled telephone cord.

6. The method of claim 4, wherein the information providing device includes a housing having a pocket, and a card which fits into said pocket, said set of instructions being included on said card, said method further comprising inserting said card into said pocket.

7. A method of providing a user of a responsive electronic device with a set of instructions respecting the use and function of said responsive electronic device, said method comprising the steps of:
   (a) providing a responsive electronic device, said responsive electronic device being a telephone, said telephone including a handset and a telephone base interconnected by an extensible, coiled telephone cord;
   (b) providing an attachable information providing device, said information providing device including means for attaching said information providing device to said extensible, coiled telephone cord and a set of instructions respecting the use and function of said telephone, said means for attaching including means for substantially encircling a portion of said telephone cord; and
   (c) attaching said attachable information providing device to the telephone cord so that said set of instructions respecting the use and function of said telephone is readily readable by the user thereof, said step of attaching including substantially encircling a portion of said extensible, coiled telephone cord with said means for attaching.

8. The method of claim 7, wherein said step of substantially encircling includes completely encircling a portion of the extensible, coiled telephone cord.

9. A method of claim 7, wherein the information providing device includes a housing having a pocket, and a card which fits into said pocket, said set of instructions being included on said card, said method further comprising inserting said card into said pocket.

* * * * *

UNITED STATES PATENT AND TRADEMARK OFFICE
CERTIFICATE OF CORRECTION

PATENT NO. : 5,113,612
DATED : May 19, 1992
INVENTOR(S) : James A. Machen

It is certified that error appears in the above-indentified patent and that said Letters Patent is hereby corrected as shown below:

```
Column 1, line 8
    DELETE "07/393,428" and INSERT therefor
    --07/393,529--.

Column 1, line 61
    DELETE "cored" and INSERT therefor --cord--.

Column 3, line 6
    DELETE "." after the word "without".

Column 9, line 28 (claim 1)
    DELETE "respective" and INSERT therefor
        --respecting--.

Column 9, line 56 (claim 4)
    DELETE "user" and INSERT therefore --use--.

Column 10, line 6 (claim 4)
    DELETE "user" and INSERT therefor --use--.
```

Signed and Sealed this

Ninth Day of November, 1993

*Attest:*

BRUCE LEHMAN

*Attesting Officer*   *Commissioner of Patents and Trademarks*